(12) United States Patent
Ou-Yang et al.

(10) Patent No.: US 11,777,442 B1
(45) Date of Patent: Oct. 3, 2023

(54) POLYHEDRON DEVICE FOR SENSING LIGHT RAYS

(71) Applicant: NATIONAL YANG MING CHIAO TUNG UNIVERSITY, Hsinchu (TW)

(72) Inventors: Mang Ou-Yang, Hsinchu (TW); Yung-Jhe Yan, Taipei (TW); Tse-Yu Cheng, Taoyuan (TW); Guan-Yu Huang, Kaohsiung (TW); Chang-Hsun Liu, New Taipei (TW); Yu-Siou Liu, Xizhou Township (TW); Ying-Wen Jan, Hsinchu (TW); Chen-Yu Chan, Hsinchu (TW); Tung-Yun Hsieh, Taipei (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 0 days.

(21) Appl. No.: 17/810,481

(22) Filed: Jul. 1, 2022

(30) Foreign Application Priority Data

Mar. 28, 2022 (TW) .................................. 111111754

(51) Int. Cl.
*H02S 20/32* (2014.01)
*G01S 3/786* (2006.01)

(52) U.S. Cl.
CPC ............ *H02S 20/32* (2014.12); *G01S 3/7861* (2013.01)

(58) Field of Classification Search
CPC ............................... H02S 20/32; G01S 3/7861
See application file for complete search history.

(56) References Cited

U.S. PATENT DOCUMENTS

| 7,893,391 | B2 | 2/2011 | Horne et al. |
| 9,360,310 | B2* | 6/2016 | Tan .......................... G01V 8/20 |
| 10,393,851 | B2* | 8/2019 | Mehrl ...................... F24S 50/20 |
| 2014/0264700 | A1 | 9/2014 | Janson |
| 2020/0408907 | A1 | 12/2020 | Østby et al. |

FOREIGN PATENT DOCUMENTS

| CN | 201656838 U | 11/2010 |
| CN | 105043537 B | 10/2018 |

(Continued)

OTHER PUBLICATIONS

J Wang et al, "A Sun Sensor Based on Regular Pyramid Sensor Arrays", IOP Conf. Series: Journal of Physics: Conf. Series 1207 (2019).

(Continued)

*Primary Examiner* — Seung C Sohn
(74) *Attorney, Agent, or Firm* — Rosenberg, Klein & Lee

(57) ABSTRACT

A polyhedron device for sensing light rays and detecting incident directions of the light rays includes a polyhedron mounting seat. The polyhedron mounting seat includes a bottom surface, a top surface, and side surfaces, wherein the bottom surface is opposite to the top surface. The side surfaces, located between the top surface and the bottom surface and inclined to the bottom surface, face toward different directions. The side surfaces are respectively provided with first light sensors. The top surface is provided with at least one second light sensor. The specific design of the polyhedron mounting seat is provided to the sensor for detecting a light ray at a larger angle, thereby measuring the finer data.

9 Claims, 5 Drawing Sheets

(56) References Cited

FOREIGN PATENT DOCUMENTS

TW         201013133 A     4/2010
TW         201140005 A     11/2011

OTHER PUBLICATIONS

Lorenzo Cercós Pita et al, "Getting More Performance from INTA NanoSat-1B Truncated Pyramid Sun Sensors", IEEE Sensors Journal, vol. 14, No. 6, Jun. 2014.
Guan-Yu Huang et. al., "Preliminary Study of Sun Sensors", international Conference on Astronautics and Space Exploration (iCASE) Hsinchu, Taiwan, Nov. 14, 2020.
Office Action with appended Search Report, which was issued to Taiwanese counterpart application No. 111111754 dated Nov. 23, 2022.

\* cited by examiner

POLYHEDRON DEVICE FOR SENSING LIGHT RAYS

This application claims priority of Application No. 111111754 filed in Taiwan on 28 Mar. 2022 under 35 U.S.C. § 119; the entire contents of all of which are hereby incorporated by reference.

BACKGROUND OF THE INVENTION

Field of the Invention

The present invention relates to a technology for detecting light information, particularly to a polyhedron device for sensing light rays.

Description of the Related Art

With the development of aerospace technology, the application of flight control systems becomes more and more important. The positioning system for the sun in space is an important part, which can not only maximize the efficiency of solar panels, but also provide orientation for a pose controlling system to maintain the normal operation of the satellite.

The present solar sensors are classified into fine sensors and coarse sensors. However, although the fine sensor has high sensing accuracy, the fine sensor has the drawback of a narrower field of view (FOV). Although the coarse sensor has a wider field of view, the sensing accuracy of the coarse sensor is lower than that of the fine sensor. As a result, if the coarse sensor and the fine sensor can be effectively matched, the FOV and sensing accuracy of the solar sensors can be increased, so as to achieve the lowest cost and the highest benefit.

To overcome the abovementioned problems, the present invention provides a polyhedron device for sensing light rays, so as to solve the afore-mentioned problems of the prior art.

SUMMARY OF THE INVENTION

The primary objective of the present invention provides a polyhedron device for sensing light rays, wherein the specific design of a polyhedron mounting seat is provided to a sensor for detecting a light ray at a large angle, thereby measuring finer and stable data.

Another objective of the present invention provides a polyhedron device for sensing light rays, wherein the structure of the polyhedron can complement the deficiencies of the fineness of a coarse sensor, improve the shortcomings in the narrow field of view of a fine sensor, and complement each other in application.

In order to achieve the foregoing purposes, the present invention provides a polyhedron device for sensing light rays and detecting incident directions of the light rays. The polyhedron device includes a polyhedron mounting seat, a plurality of first light sensors, and at least one second light sensor. The polyhedron mounting seat includes a bottom surface, a top surface, and side surfaces. The bottom surface is opposite to the top surface. The side surfaces, located between the top surface and the bottom surface and inclined to the bottom surface, face toward different directions. The first light sensors are respectively arranged on the side surfaces. The second light sensor is arranged on the top surface.

In an embodiment, an included angle between the bottom surface and each of the side surfaces has a range of 5~85 degrees.

In an embodiment, the area of the top surface is less than that of the bottom surface.

In an embodiment, the field of view (FOV) of the first light sensor is larger than that of the at least one second light sensor.

In an embodiment, the first light sensors are coarse solar sensors. The second light sensor includes a sensing unit and a mask. The sensing unit has a first sensing area, a second sensing area, a third sensing area, and a fourth sensing area. The first sensing area, the second sensing area, the third sensing area, and the fourth sensing area are respectively configured to generate a first sensing signal, a second sensing signal, a third sensing signal, and a fourth sensing signal based on an intensity of the light ray. The mask covers the sensing unit and has an X-shaped light transmitting portion. The light ray passes through the X-shaped light transmitting portion to form an X-axis light ray and a Y-axis light ray. The X-axis light ray intersects the Y-axis light ray. The intersection of the X-axis light ray and the Y-axis light ray falls on one of the first sensing area, the second sensing area, the third sensing area, and the fourth sensing area.

In an embodiment, the polyhedron device for sensing light rays further includes a processor coupled to the first light sensors and the second light sensor. The processor is configured to receive fifth sensing signals from the first light sensors, receive the first sensing signal, the second sensing signal, the third sensing signal, and the fourth sensing signal from the at least one second light sensor, and determine the information of an incident direction of the light ray based on the first sensing signal, the second sensing signal, the third sensing signal, the fourth sensing signal, and the fifth sensing signals.

Below, the embodiments are described in detail in cooperation with the drawings to make easily understood the technical contents, characteristics and accomplishments of the present invention.

DETAILED DESCRIPTION OF THE INVENTION

The present invention provides a polyhedron device for sensing light rays, which can be applied in the field of aerospace technology to detect the incident direction of solar light in space, thereby using solar energy more effectively.

Figure 1:
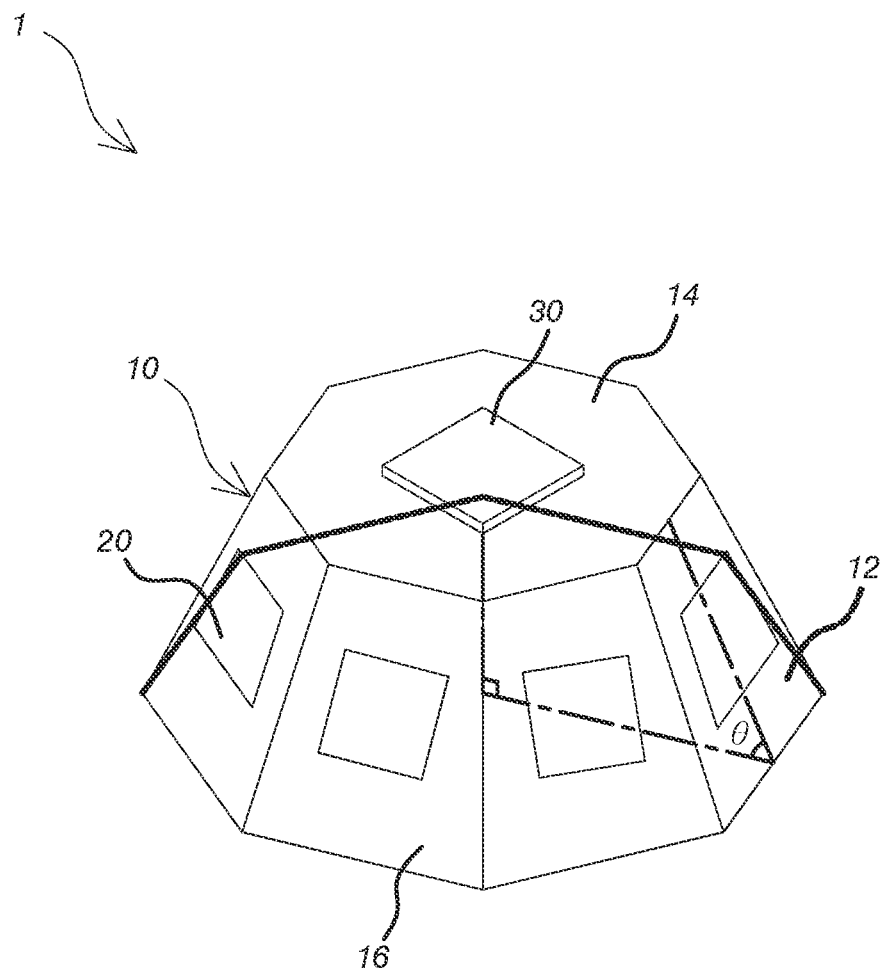
FIG. 1 is a perspective view of a polyhedron device for sensing light rays according to an embodiment of the present invention.

Referring to FIG. 1, the structure of a polyhedron device 1 for sensing to light rays is detailed as follows. The polyhedron device 1 includes a polyhedron mounting seat 10, a plurality of first light sensors 20, and at least one second light sensor 30. The polyhedron mounting seat 10 includes a bottom surface 12, a top surface 14, and side surfaces 16. The bottom surface 12 is opposite to the top surface 14. In the embodiment, the bottom surface 12 is an octagonal bottom surface, and the top surface 14 is an octagonal top surface. In addition, the area of the top surface 14 is less than that of the bottom surface 12.

The side surfaces 16 are located between the top surface 14 and the bottom surface 12. Since the area of the top surface 14 is less than that of the bottom surface 12, the side surfaces 16 are inclined to the bottom surface 12. Thus, an included angle between the bottom surface 12 and each of the side surfaces 16 has a range of 5~85 degrees. The side surfaces 16 are respectively connected with the sides of the octagon, such that the side surfaces 16 face toward different directions.

In the embodiment, the number of the first light sensors 20 is eight. Thus, the first light sensors 20 are respectively arranged on the side surfaces 16. The first light sensors 20 respectively face toward different directions and sense light rays at different angles. The first light sensors 20 may respectively generate fifth sensing signals of different currents (I) based on the intensities of the light rays.

The at least one second light sensor 30 is arranged on the top surface 14. The field of view (FOV) of the first light sensor 20 is larger than the field of view of the second light sensor 30. In the embodiment, the field of view of the first light sensor 20 has a range of 160~175 degrees, and the field of view of the second light sensor 30 has a range of 100~140 degrees. The first light sensor 20 is a coarse solar sensor with lower cost.

The second light sensor 30 is a four-quadrant fine sensor with higher cost. The combination of the first light sensor 20 and the second light sensor 30 can complement the deficiencies of the fineness of the first light sensor 20 and improve the shortcomings in the narrow field of view of the second light sensor 30.

Figure 2:
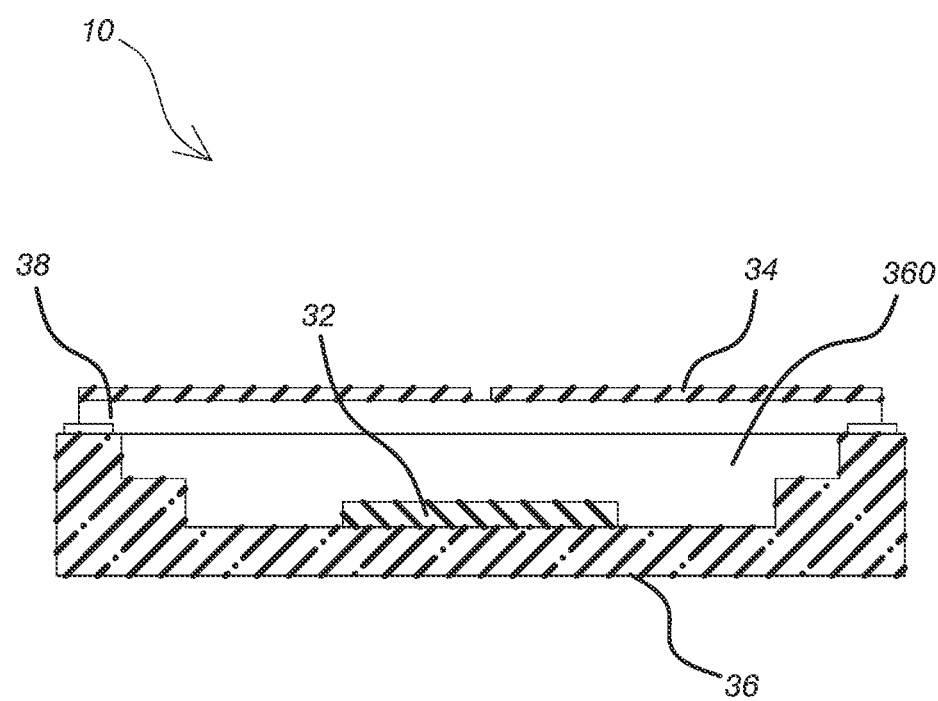
FIG. 2 is a cross-sectional view of a sensor according to an embodiment of the present invention.

Referring to FIG. 2, the second light sensor 30 is detailed as follows. The second light sensor 30 includes a sensing unit 32, a mask 34, a substrate 36, and a transparent object 38. The transparent object 38 may be a glass plate. The recess 360 of the substrate 36 is used to accommodate the sensing unit 32. The opening of the recess 360 of the substrate 36 is covered with the transparent object 38. The transparent object 38 is provided with the mask 34 thereon. The mask 34 covers the sensing unit 32 to shield a part of the light ray.

Figure 3:
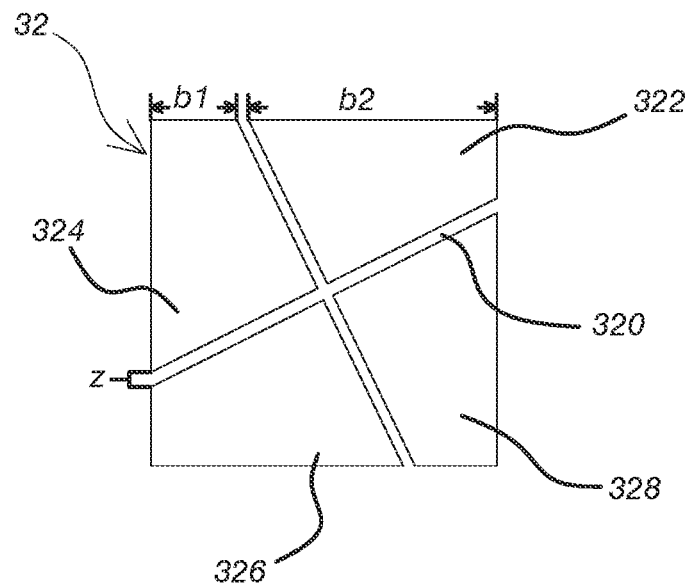
FIG. 3 is a top view of a sensing unit according to an embodiment of the present invention.

Referring to FIG. 3, the structure of the sensing unit 32 is introduced as follows. In the embodiment, the sensing unit 32 is a light sensing component. The sensing unit 32 is a square sensing unit that has crossing lines 320. The crossing lines 320 divide the sensing unit 32 into a first sensing area 322, a second sensing area 324, a third sensing area 326, and a fourth sensing area 328 and divide each edge of the square sensing unit 32 into a first line segment b1 and a second line segment b2. In the embodiment, the ratio of the width z of the crossing line 320 to the length of the first line segment b1 to the length of the second line segment b2 is 1:2:8. Thus, each of the first sensing area 322, the second sensing area 324, the third sensing area 326, and the fourth sensing area 328 divided by the crossing lines 320 has a shape of a trapezoid. Alternatively, the ratio of the width z of the crossing line 320 to the length of the first line segment b1 to the length of the second line segment b2 is 1:8:2. The present invention is not limited to the ratio of the width z of the crossing line 320 to the length of the first line segment b1 to the length of the second line segment b2.

The first sensing area 322, the second sensing area 324, the third sensing area 326, and the fourth sensing area 328 may respectively generate a first sensing signal, a second sensing signal, a third sensing signal, and a fourth sensing signal of different currents (I) based on the intensities of the light rays.

Figure 4:
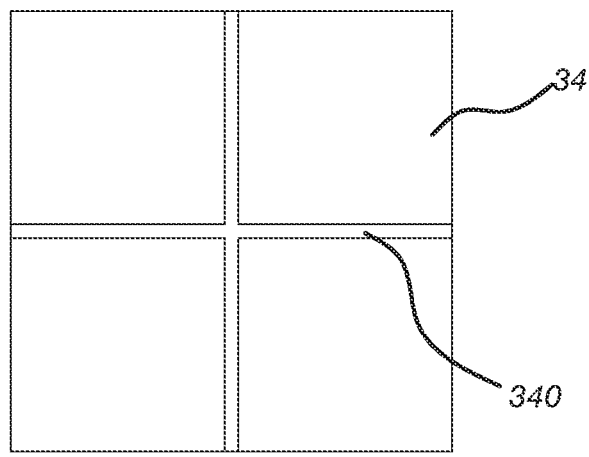
FIG. 4 is a top view of a mask according to an embodiment of the present invention.
Figure 5:
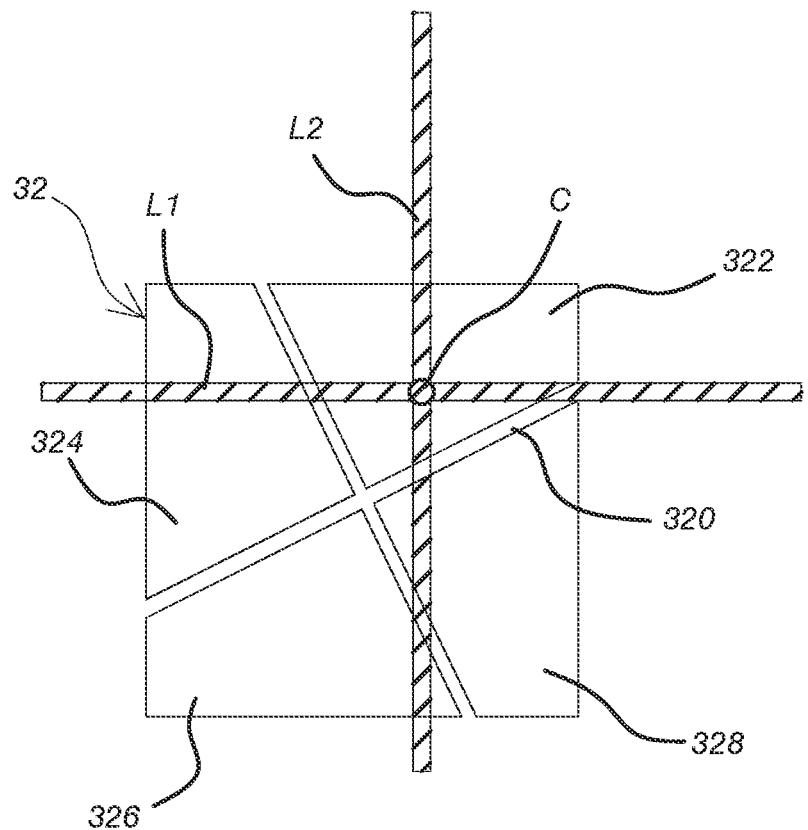
FIG. 5 is a schematic diagram illustrating the state of irradiating a sensing unit with a light ray according to an embodiment of the present invention.

Referring to FIG. 4 and FIG. 5, the structure of the mask 34 is introduced as follows. The mask 34 has an X-shaped light transmitting portion 340. The light ray penetrates through the X-shaped light transmitting portion 340 to form an X-axis light ray L1 and a Y-axis light ray L2. The X-axis light ray L1 intersects the Y-axis light ray L2. The intersection C of the X-axis light ray L1 and the Y-axis light ray L2 falls on one of the first sensing area 322, the second sensing area 324, the third sensing area 326, and the fourth sensing area 328.

Figure 6:
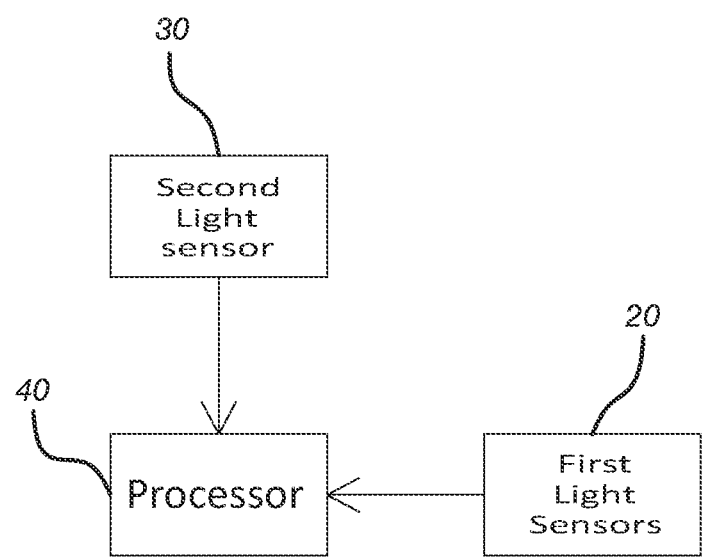
FIG. 6 is a block diagram illustrating a first light sensor, a second light sensor, and a processor according to an embodiment of the present invention.

Then, the present invention explains how the sensor senses the angle of the light ray. Referring to FIG. 5 and FIG. 6, the polyhedron device 1 may further include a processor 40 in addition to the foregoing components. The processor 40 may be a central processing unit (CPU) with operation functions. The processor 40 is coupled to the first light sensors 20 and the second light sensor 30. The processor 40 receives the fifth sensing signals from the first light sensors 20, receives the first sensing signal, the second sensing signal, the third sensing signal, and the fourth sensing signal from the second light sensor 30, and determines the information of the incident direction of the light ray based on the first sensing signal, the second sensing signal, the third sensing signal, the fourth sensing signal, and the fifth sensing signals.

In the step of determining the information of the incident direction of the light ray by the processor 40, the first light sensor 20 transmits the fifth sensing signal with identity tag information that corresponds to the first light sensor 20. Thus, the processor 40 can determine the first light sensor 20 for transmitting the fifth sensing signal, determine the direction of the light ray according to the location of the first light sensor 20, and determine the incident angle of the light ray based on the fifth sensing signal. In addition, the first light sensors 20 can respectively generate the fifth sensing signals of different currents (I) based on the intensities of the light rays, such that the processor 40 determines the intensities of the light rays according to the currents of the fifth sensing signals.

The processor 40 determines the information of the incident direction based on the first sensing signal, the second sensing signal, the third sensing signal, and the fourth sensing signal. Referring to FIG. 5, when the light ray is irradiated to the second light sensor 30, the light ray passes through the X-shaped light transmitting portion 140 of the mask 14 to form an X-axis light ray L1 and a Y-axis light ray L2. The X-axis light ray L1 intersects the Y-axis light ray L2. The intersection C of the X-axis light ray L1 and the Y-axis light ray L2 falls on one of the first sensing area 322, the second sensing area 324, the third sensing area 326, and the fourth sensing area 328. Thus, the first sensing area 322, the second sensing area 324, the third sensing area 326, and the fourth sensing area 328 respectively generate the first sensing signal, the second sensing signal, the third sensing signal, and the fourth sensing signal based on the intensity of the light ray. In the embodiment, the first sensing signal, the second sensing signal, the third sensing signal, and the fourth sensing signal may be currents (I). The generated current is larger when the intensity of the light ray is higher.

The processor 40 receives the first sensing signal, the second sensing signal, the third sensing signal, and the fourth sensing signal and incorporates the first sensing signal, the second sensing signal, the third sensing signal, and the fourth sensing signal into representative correction equations to lead a first correction sensing signal, a second correction sensing signal, a third correction sensing signal, and a fourth correction sensing signal. The representative correction equations include:

$$I_1 - D_1 \times \text{magnification} = I_{1c};$$

$$I_2 - D_1 \times \text{magnification} = I_{2c};$$

$$I_3 - D_1 \times \text{magnification} = I_{3c}; \text{ and}$$

$$I_4 - D_1 \times \text{magnification} = I_{4c};$$

where $I_1$ represents the first sensing signal, $I_2$ represents the second sensing signal, $I_3$ represents the third sensing signal, $I_4$ represents the fourth sensing signal, $D_1$ represents a basing signal, $I_{1c}$ represents the first correction sensing signal, $I_{2c}$ represents the second correction sensing signal, $I_{3c}$ represents the third correction sensing signal, and $I_{4c}$ represents the fourth correction sensing signal. The basing signal is a previously-collected standard environment signal. Correction sensors (not shown) around the sensing unit 32 read dark currents generated by ambient temperature or other environmental parameters, and calculate the proportional relationship to eliminate the dark currents, thereby correcting the signal parameters The processor 40 determines the falling point position of the light ray based on currents of the first correction sensing signal, the second correction sensing signal, the third correction sensing signal, and the fourth correction sensing signal. The falling point position includes the position of the sensing unit 32 where the intersection C is fallen. The falling point position is led by incorporating the first correction sensing signal, the second correction sensing signal, the third correction sensing signal, and the fourth correction sensing signal into representative falling point equations. The representative falling point equations includes:

$$I_{1c} > I_{3c} \text{ \& } I_{4c} > I_{2c} \rightarrow \text{falling on the first sensing area};$$

$$I_{1c} > I_{2c} \text{ \& } I_{2c} > I_{4c} \rightarrow \text{falling on the second sensing area};$$

$$I_{3c} > I_{1c} \text{ \& } I_{2c} > I_{4c} \rightarrow \text{falling on the third sensing area}; \text{ and}$$

$$I_{3c} > I_{1c} \text{ \& } I_{4c} > I_{2c} \rightarrow \text{falling on the fourth sensing area},$$

where $I_{1c}$ represents the first correction sensing signal, $I_2$, represents the second correction sensing signal, $I_{3c}$ represents the third correction sensing signal, and $I_{4c}$ represents the fourth correction sensing signal.

After determining the falling point area, the processor 40 determines the X-axis incident angle and the Y-axis incident angle of the light ray based on the first correction sensing signal, the second correction sensing signal, the third correction sensing signal, and the fourth correction sensing signal. The processor 40 incorporates the first correction sensing signal, the second correction sensing signal, the third correction sensing signal, and the fourth correction sensing signal into a first representative equation to lead the X-axis incident angle. The first representative equation includes $$\theta_x = \tan^{-1}\left(\frac{(c_L I_{2c} + c_U I_{1c}) - (c_D I_{3c} + c_R I_{4c})}{c_R I_{4c} + c_U I_{1c} + c_L I_{2c} + c_D I_{3c}}\right) \cdot C,$$

where $\theta_x$ represents the X-axis incident angle, $C_U$ represents the weight of the first sensing area, $C_L$ represents the weight of the second sensing area, $C_D$ represents the weight of the third sensing area, $C_R$ represents the weight of the fourth sensing area, C represents a constant, $I_{1c}$ represents the first correction sensing signal, $I_{2c}$ represents the second correction sensing signal, $I_{3c}$ represents the third correction sensing signal, and $I_{4c}$ represents the fourth correction sensing signal.

The processor 40 incorporates the first correction sensing signal, the second correction sensing signal, the third correction sensing signal, and the fourth correction sensing signal into a second representative equation to lead the Y-axis incident angle. The second representative equation includes $$\theta_y = \tan^{-1}\left(\frac{((1-c_U)I_{1c} + (1-c_R)I_{4c}) - ((1-c_D)I_{3c} + (1-c_L)I_{2c})}{(1-c_R)I_{4c} + (1-c_U)I_{1c} + (1-c_L)I_{2c} + (1-c_D)I_{3c}}\right) \cdot C,$$

where $\theta_y$ represents the Y-axis incident angle, $C_U$ represents the weight of the first sensing area, $C_L$ represents the weight of the second sensing area, $C_D$ represents the weight of the third sensing area, $C_R$ represents the weight of the fourth sensing area, C represents a constant, $I_{1c}$ represents the first correction sensing signal, $I_{2c}$ represents the second correction sensing signal, $I_{3c}$ represents the third correction sensing signal, and $I_{4c}$ represents the fourth correction sensing signal.

In conclusion, the present invention employs the specific design of a polyhedron mounting seat to provide the sensor for detecting a light ray at a large angle, thereby measuring finer and stable data. The fine sensor can complement the deficiencies of the fineness of the coarse sensor. The coarse sensor can improve the shortcomings in the narrow field of view of the fine sensor. The coarse sensor and the fine sensor complement each other in application to produce an unexpectable effect.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A polyhedron device for sensing light rays and detecting incident directions of the light rays, comprising:
   a polyhedron mounting seat comprising a bottom surface, a top surface, and side surfaces, wherein the bottom surface is opposite to the top surface, and the side surfaces, located between the top surface and the bottom surface and inclined to the bottom surface, face toward different directions;
   a plurality of first light sensors respectively arranged on the side surfaces; and
   at least one second light sensor arranged on the top surface;
   wherein the at least one second light sensor comprises:
   a sensing unit having a first sensing area, a second sensing area, a third sensing area, and a fourth sensing area, wherein the first sensing area, the second sensing area, the third sensing area, and the fourth sensing area are respectively configured to generate a first sensing signal, a second sensing signal, a third sensing signal, and a fourth sensing signal based on an intensity of the light ray; and a mask covering the sensing unit and having an X-shaped light transmitting portion, wherein the light ray passes through the X-shaped light transmitting portion to form an X-axis light ray and a Y-axis light ray, the X-axis light ray intersects the Y-axis light ray, and an intersection of the X-axis light ray and the Y-axis light ray falls on one of the first sensing area, the second sensing area, the third sensing area, and the fourth sensing area.

2. The polyhedron device for sensing light rays according to claim 1, wherein an included angle between the bottom surface and each of the side surfaces has a range of 5~85 degrees.

3. The polyhedron device for sensing light rays according to claim 1, wherein an area of the top surface is less than that of the bottom surface.

4. The polyhedron device for sensing light rays according to claim 1, wherein a field of view (FOV) of each of the plurality of first light sensors is larger than a field of view of the at least one second light sensor.

5. The polyhedron device for sensing light rays according to claim 1, wherein a field of view of each of the plurality of first light sensors has a range of 16~175 degrees.

6. The polyhedron device for sensing light rays according to claim 1, wherein a field of view of the at least one second light sensor has a range of 10~140 degrees.

7. The polyhedron device for sensing light rays according to claim 1, wherein the plurality of first light sensors are coarse solar sensors.

8. The polyhedron device for sensing light rays according to claim 1, wherein the sensing unit is a square sensing unit that has crossing lines, the crossing lines divide the sensing unit into the first sensing area, the second sensing area, the third sensing area, and the fourth sensing area and divide each edge of the square sensing unit into a first line segment and a second line segment, and a ratio of a length of the first line segment to a length of the second line segment is 2:8 or 8:2.

9. The polyhedron device for sensing light rays according to claim 1, further comprising a processor coupled to the plurality of first light sensors and the at least one second light sensor and configured to receive fifth sensing signals from the plurality of first light sensors, receive the first sensing signal, the second sensing signal, the third sensing signal, and the fourth sensing signal from the at least one second light sensor, and determine information of an incident direction of the light ray based on the first sensing signal, the second sensing signal, the third sensing signal, the fourth sensing signal, and the fifth sensing signals.

* * * * *